(12) United States Patent
Komori et al.

(10) Patent No.: US 10,706,999 B2
(45) Date of Patent: Jul. 7, 2020

(54) MAGNETORHEOLOGICAL FLUID COMPOSITION AND VIBRATION DAMPING DEVICE USING SAME

(71) Applicants: HONDA MOTOR CO., LTD., Minato-ku, Tokyo (JP); IDEMITSU KOSAN CO., LTD., Chiyoda-ku, Tokyo (JP)

(72) Inventors: Kentaro Komori, Wako (JP); Daijiro Endo, Wako (JP); Shuichi Sakanoue, Ichihara (JP); Seiichiro Yamamoto, Tokyo (JP)

(73) Assignees: Honda Motor Co., Ltd., Tokyo (JP); Idemitsu Kosan Co., Ltd., Tokyo (JP)

( * ) Notice: Subject to any disclaimer, the term of this patent is extended or adjusted under 35 U.S.C. 154(b) by 359 days.

(21) Appl. No.: 15/759,747

(22) PCT Filed: Sep. 15, 2016

(86) PCT No.: PCT/JP2016/077219
§ 371 (c)(1),
(2) Date: Mar. 13, 2018

(87) PCT Pub. No.: WO2017/047682
PCT Pub. Date: Mar. 23, 2017

(65) Prior Publication Data
US 2018/0182521 A1   Jun. 28, 2018

(30) Foreign Application Priority Data

Sep. 15, 2015 (JP) ................... 2015-181556

(51) Int. Cl.
*H01F 1/44* (2006.01)
*C10M 133/06* (2006.01)
(Continued)

(52) U.S. Cl.
CPC .......... *H01F 1/447* (2013.01); *C10M 133/06* (2013.01); *C10M 171/00* (2013.01);
(Continued)

(58) Field of Classification Search
CPC .......... H01F 1/447; F16F 9/535; F16F 15/023
See application file for complete search history.

(56) References Cited

U.S. PATENT DOCUMENTS 10,634,208 B2 * 4/2020 Komori ............... F16F 9/535
2006/0105924 A1   5/2006 Yuki et al.
(Continued)

FOREIGN PATENT DOCUMENTS

CN         1643119 A     7/2005
CN       103597241 A     2/2014
(Continued)

OTHER PUBLICATIONS

Office Action dated Mar. 29, 2019 issued in the corresponding Chinese Patent Application No. 201680053375.1 with the English translation thereof.

*Primary Examiner* — C Melissa Koslow
(74) *Attorney, Agent, or Firm* — Carrier Blackman & Associates, P.C.; Joseph P. Carrier; William D. Blackman

(57) ABSTRACT

This vibration damping device (10) includes a magnetorheological fluid composition in a cylinder (12). The magnetorheological fluid composition includes magnetic particles; a dispersant having the magnetic particles dispersed therein; and a friction modifier. The friction modifier is an amine-based additive having a hydrocarbon chain having 14 to 22 carbon atoms, preferably an alkyl chain or an alkenyl chain. The content of the friction modifier is 0.1 to 5 mass %.

2 Claims, 6 Drawing Sheets

(51) Int. Cl.
  *C10M 171/00* (2006.01)
  *F16F 9/53* (2006.01)
  *F16F 15/023* (2006.01)

(52) U.S. Cl.
  CPC ......... *C10M 171/001* (2013.01); *F16F 9/535* (2013.01); *F16F 15/023* (2013.01); *C10M 2215/04* (2013.01); *C10N 2230/06* (2013.01); *C10N 2230/60* (2013.01); *C10N 2240/205* (2013.01)

(56) References Cited

U.S. PATENT DOCUMENTS

| | | |
|---|---|---|
| 2010/0078586 A1 | 4/2010 | Oetter et al. |
| 2014/0110200 A1 | 4/2014 | Saito et al. |

FOREIGN PATENT DOCUMENTS

| | | | |
|---|---|---|---|
| JP | H09-027414 A | | 1/1997 |
| JP | 2001-267117 A | | 9/2001 |
| JP | 2004-200193 A | | 7/2004 |
| JP | 2008-069858 A | | 3/2008 |
| JP | 2009-500816 A | | 1/2009 |
| JP | 2010-019325 A | | 1/2010 |
| WO | WO 2017/151562 | * | 9/2017 |

* cited by examiner

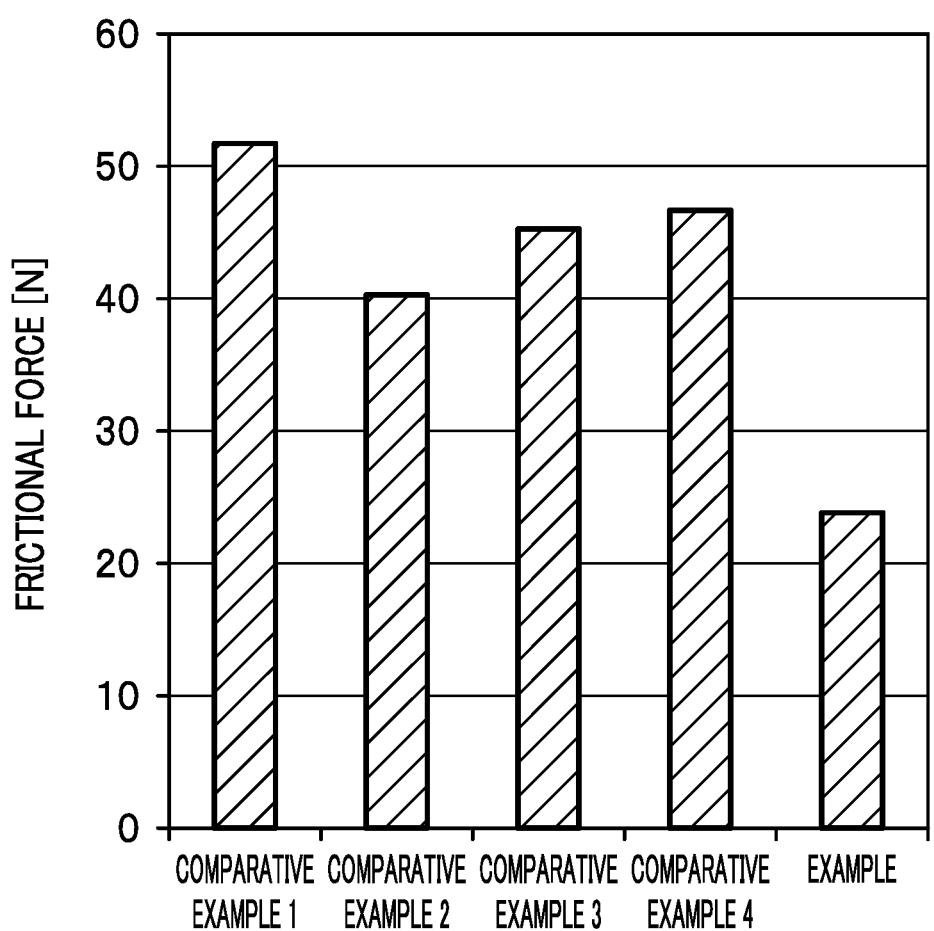

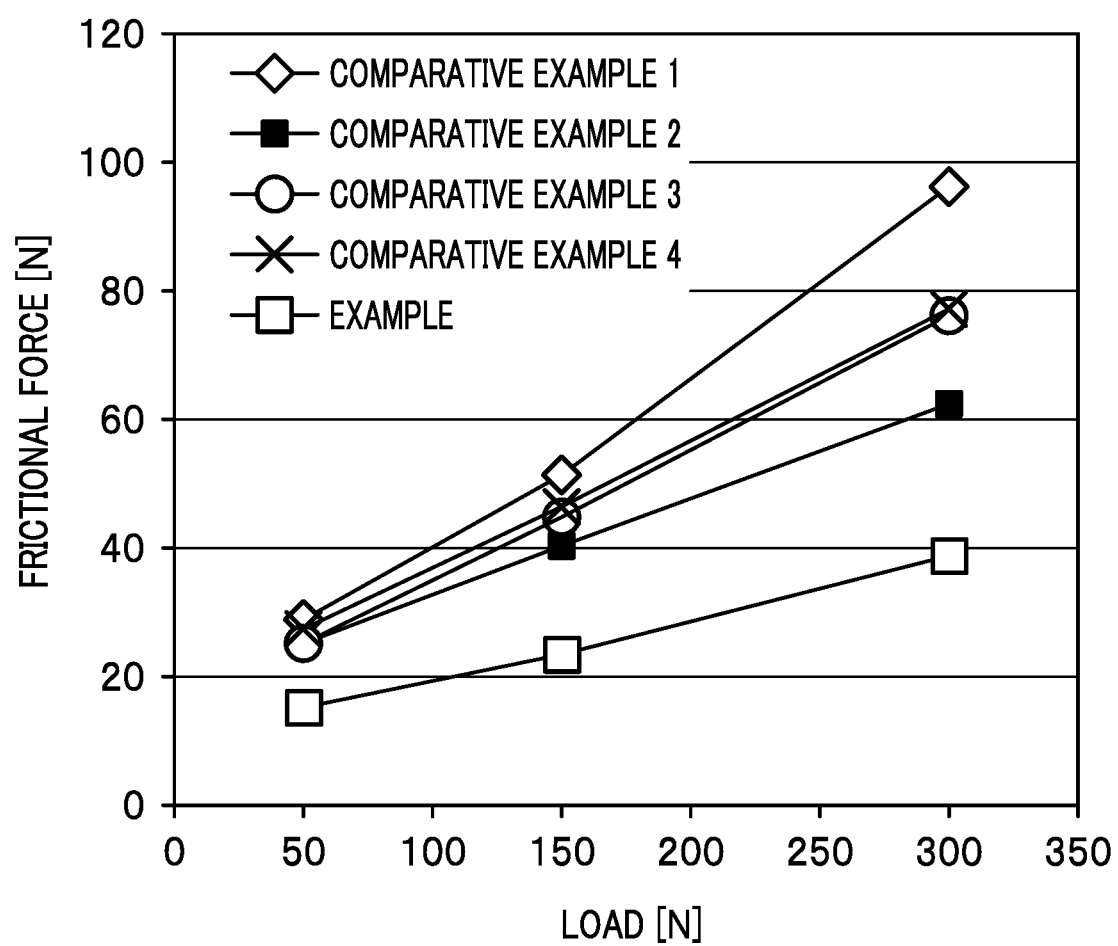

MAGNETORHEOLOGICAL FLUID COMPOSITION AND VIBRATION DAMPING DEVICE USING SAME

TECHNICAL FIELD

The present invention relates to a magnetorheological fluid composition and a vibration damping device using the same.

BACKGROUND ART

As a vibration damping device, a variable damping force damper has been known which uses a magnetorheological fluid (MRF) composition to change its apparent viscosity depending on the strength of a magnetic field applied to the MRF composition. This vibration damping device damps incoming vibration using flow resistance of the MRF composition which is caused when a piston reciprocates in a cylinder filled with the MRF composition. This vibration damping device is capable of controlling the vibration damping force depending on the strength of the applied magnetic field.

Meanwhile, as the MRF composition, what is obtained by dispersing magnetic particles into a dispersant is generally used. Thus, operating pressure inside the cylinder is higher in the vibration damping device using the MRF composition than in a vibration damping device using no MRF composition. Accordingly, the vibration damping device using the MRF composition involves a problem of an increase in frictional force between frictionally slidable portions. In addition, in the vibration damping device using the MRF composition, the existence of magnetic particles of the MRF composition between the frictionally slidable portions makes the frictional force larger between the frictionally slidable portions. Incidentally, an increase in the frictional force between the frictionally slidable portions, for example, makes ride comfort performance of a vehicle, to which this vibration damping device is applied, become worse, and makes the vibration damping device less adaptable to a light-weight vehicle.

A vibration damping device has been disclosed in which: a piston rod connected to a piston is slidably supported by an end portion of a cylinder with a bearing; and this bearing is surrounded by a porous member (see Patent Literature 1, for example).

This vibration damping device prevents the magnetic particles from existing between the frictionally slidable portion of the piston rod and the frictionally slidable portion of the bearing by supplying only liquid components of the MRF composition, which are obtained by filtering the magnetic particles from the MRF composition by the porous member, to the interstice between the frictionally slidable portions.

In addition, a magnetic fluid formulation has been also known which is prepared with re-dispersability and low-temperature fluid behavior of magnetic particles taken into consideration (see Patent Literature 2, for example). However, no lubricant composition which contributes to an increase in lubricity between the frictionally slidable portions, such as a decrease in frictional force between the frictionally slidable portions while the vibration damping device is in operation, has been known yet.

CITATION LIST

Patent Literatures

Patent Literature 1: Japanese Patent Application Publication No. 2008-69858
Patent Literature 2: Japanese Patent Translation Publication No. 2009-500816

SUMMARY OF INVENTION

Technical Problem

The above-discussed vibration damping device (see Patent Literature 1, for example) requires seal members to be arranged in multiple locations in order for the MRF composition (liquid components) to be supplied to the interstice between the frictionally slidable portions via the porous member alone. To put it specifically, a seal member is placed at least between the inner wall of the cylinder and the porous member, as well as between the piston rod and the porous member, in addition to a seal member being placed between the inner wall of the cylinder and the piston rod. This vibration damping device also involves a problem of an increase in the frictional force while the piston rod is reciprocating relative to the cylinder, since the multiple seal members are arranged in the respective multiple locations around the piston rod.

What is more, the conventional vibration damping device involves a problem of an increase in the number of component parts, a complexed device configuration, and a resultant increase in manufacturing costs.

With the above-discussed problems taken into consideration, an object of the present invention is to provide: a magnetorheological fluid composition which is capable of helping a vibration damping device to basically reduce frictional force between a piston rod and a rod guide while the vibration damping device is in operation, without relying on sliding structures of the piston rod and the rod guide; and a vibration damping device using the magnetorheological fluid composition.

Solution to Problem

The inventors have found that use of a MRF composition blended with a predetermined chemical component leads to elimination of seal members from a vibration damping device, and accordingly have arrived at the present invention.

The magnetorheological fluid composition according to the present invention, which has solved the above-discussed problems, includes magnetic particles, a dispersant having the magnetic particles dispersed in the dispersant, and a friction modifier; the friction modifier is an amine-based additive having a hydrocarbon chain having 14 to 22 carbon atoms; and the content of the friction modifier is 0.1 to 5 mass % relative to a total amount of the magnetorheological fluid composition.

The vibration damping device according to the present invention, which has solved the above-discussed problems, includes: a cylinder filled with the magnetorheological fluid composition according to claim 1; a piston rod inserted through the cylinder; a piston connected to the piston rod and disposed in the cylinder to be slidable in an axial direction; a first fluid chamber and a second fluid chamber defined in the cylinder by the piston and each containing the magnetorheological fluid composition; a communication hole formed in the piston in such a way that the first fluid chamber and the second fluid chamber communicate with each other through the communication hole; and an electromagnetic coil configured to apply a magnetic field to the magnetorheological fluid composition flowing in the communication hole.

Advantageous Effects of Invention

The present invention can provide: a magnetorheological fluid composition which is capable of helping a vibration damping device to basically reduce frictional force while the vibration damping device is in operation, without relying on sliding structures; and a vibration damping device using the magnetorheological fluid composition. The present invention further simplifies the configuration of the vibration damping device.

BRIEF DESCRIPTION OF DRAWINGS

FIG. 8 is a graph comparatively showing a result of a first measurement of frictional force of the example using the test apparatus illustrated in FIG. 7 and those of the comparative examples.

FIG. 9 is a graph comparatively showing results of a second measurement of frictional forces obtained by sliding a piston rod over the rod guide with loads (F) of 50 N, 150 N and 300 N in the example using the test apparatus illustrated in FIG. 7 and those in the comparative examples.

DESCRIPTION OF EMBODIMENTS

Descriptions will be hereinbelow provided for a magnetorheological fluid composition according to an embodiment of the present invention, and a vibration damping device using the same. The descriptions will start with an overall configuration of the vibration damping device, and go on to the magnetorheological fluid composition to be used for the vibration damping device.

<Overall Configuration of Vibration Damping Device>

Figure 1:
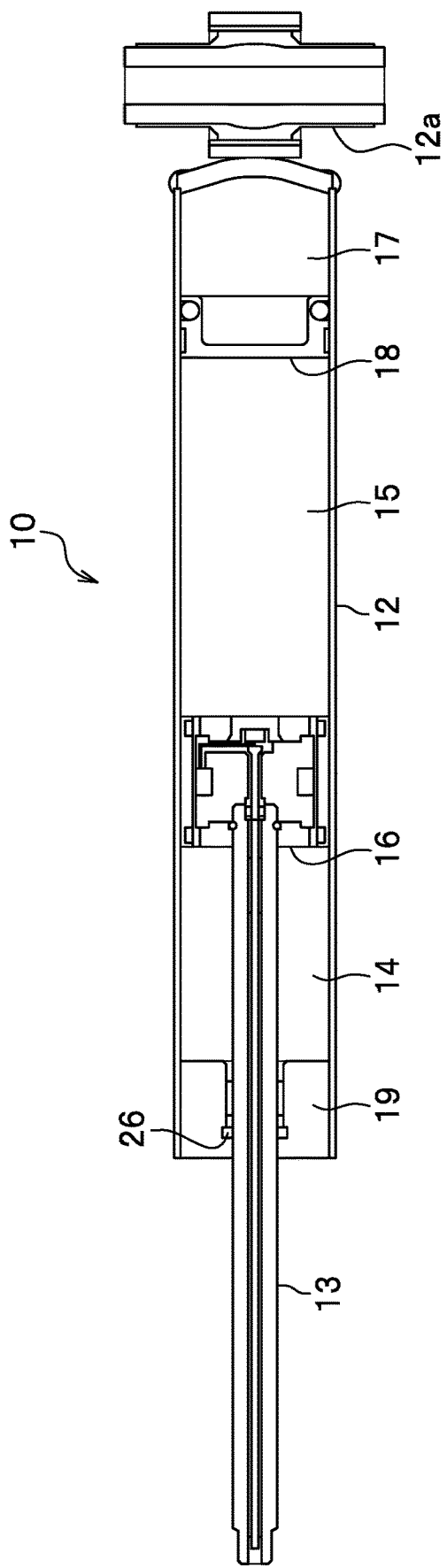
FIG. 1 is a cross-sectional view illustrating a schematic structure of a vibration damping device according to an embodiment of the present invention.

FIG. 1 is a cross-sectional view illustrating a schematic structure of the vibration damping device 10 according to the embodiment of the present invention.

The vibration damping device 10 is a mono tube-type (de Carbon-type) variable damping force vehicular damper, and is configured to control vibration damping force depending on magnitude of incoming vibration from wheels.

The vibration damping device 10 includes: a tube-shaped cylinder 12 filled with a magnetorheological fluid (MRF) composition, which will be described in detail later; a piston rod 13 slidable inside the cylinder 12 in an axial direction (longitudinal direction) of the cylinder 12; a piston 16 which is attached to the distal end of the piston rod 13, and which divides the inside of the cylinder 12 into a first fluid chamber 14 and a second fluid chamber 15; and a free piston 18 which divides the inside of the cylinder 12 into the second fluid chamber 15 and a high-pressure gas chamber 17. It should be noted that the piston 16 corresponds to a "piston" in the scope of claims.

One end of the cylinder 12 is provided with a rod guide 19 which closes the opening of the cylinder 12. The rod guide 19 has a substantially cylindrical shape.

The piston rod 13 is inserted through and supported by a center hole of the rod guide 19.

The outer circumferential surface of the piston rod 13 (a piston rod 13-side frictionally slidable portion) slides over the inner circumferential surface of the rod guide 19 (a rod guide 19-side frictionally slidable portion).

The rod guide 19 includes an oil seal 26 for preventing the magnetorheological fluid composition from leaking to the outside. Detailed descriptions will be provided for the structure of the rod guide 19 later.

The other end of the cylinder 12 is usually provided with an eyepiece 12a. For example, in a case where this vibration damping device 10 is used as a vehicular suspension, a bolt (not illustrated) is inserted in the eyepiece 12a, and the bolt is connected to a trailing arm, a wheel-side member.

Furthermore, the end portion (the end portion on the left side in FIG. 1) of the piston rod 13 is connected to a damper base, a vehicle body-side member (above a wheel house), with the assistance of a damper mount. While the vehicle is running, the outer circumferential surface of the piston 16 and the outer circumferential surface of the free piston 18 slide over the inner circumferential surface of the cylinder 12.

Figure 2:
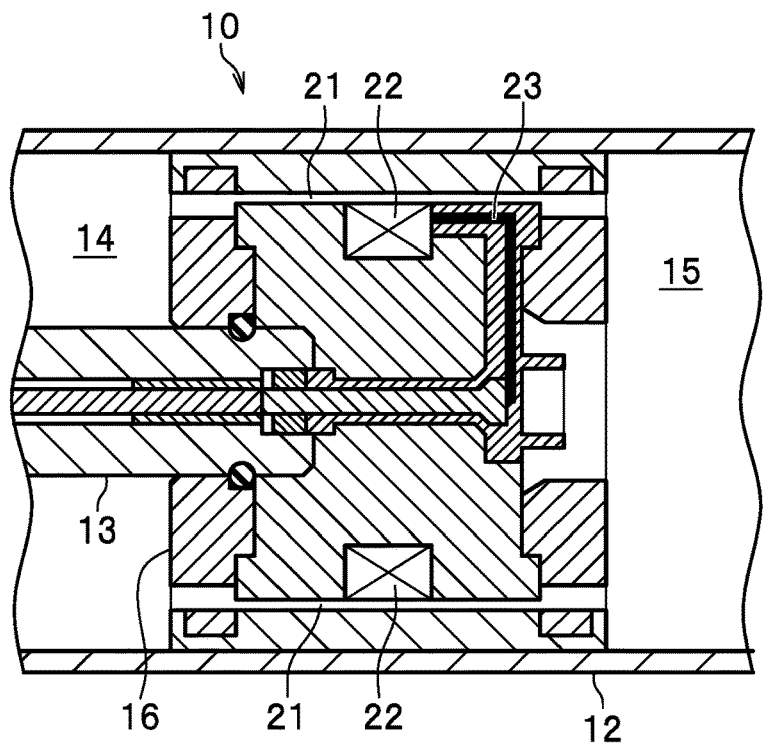
FIG. 2 is a partially magnified cross-sectional view of a piston illustrated in FIG. 1.

FIG. 2 shows a partially magnified cross-sectional view of the piston 16 illustrated in FIG. 1.

The piston 16 includes: a communication hole 21 through which the first fluid chamber 14 and the second fluid chamber 15 communicate with each other; and an electromagnetic coil 22 for applying a magnetic field to the magnetorheological fluid composition which flows in the communication hole 21. An electric current is supplied to the electromagnetic coil 22 through a power supply line 23.

The power supply line 23 runs inside the piston rod 13, is drawn out of the piston rod 13, and is connected to a predetermined control power supply (not illustrated).

When the electric current is supplied to the electromagnetic coil 22 from the control power supply through the power supply line 23, the magnetic field is applied to the magnetorheological fluid composition in the communication hole 21. On this occasion, except for the magnetorheological fluid composition flowing in the communication hole 21, the magnetorheological fluid composition is stationary, and magnetic particles included in the stationary magnetorheological fluid composition align themselves along the lines of magnetic flux to form clusters. On the other hand, the magnetorheological fluid composition in the communication hole 21 flows therein in a way that hinders the formation of clusters, and increases its apparent viscosity.

The vibration damping device 10 of the embodiment detects the magnitude, amplitude and velocity of incoming vibration using a predetermined sensor, and based on a detection signal, controls electric power to be supplied to the electromagnetic coil 22. Thereby, the vibration damping device 10 increases the apparent viscosity of the magnetorheological fluid composition in response to the magnitude of the incoming vibration, and thus controls damping force. In FIG. 2, reference sign 12 denotes the cylinder.

Figure 3:
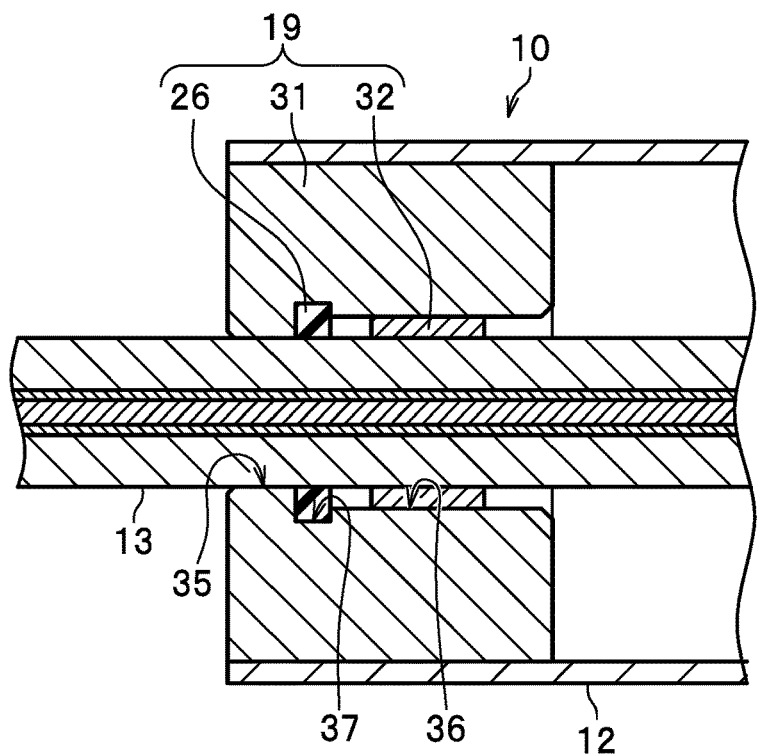
FIG. 3 is a partially magnified cross-sectional view of a rod guide illustrated in FIG. 1.

FIG. 3 shows a partially magnified cross-sectional view of the rod guide 19 illustrated in FIG. 1.

The rod guide 19 includes: a substantially cylindrical substrate part 31 which is fitted in a one end-side portion of the cylinder 12, and through which the piston rod 13 is inserted; a substantially cylindrical guide metal 32 which is disposed on the inner circumference of the substrate part 31, and which slidably supports the piston rod 13; an oil seal 26 which is disposed on the inner circumference of the substrate part 31, and which fluid-tightly seals the interstice between the substrate part and the piston rod 13 while slidably supporting the piston rod 13.

The substrate part 31 of the embodiment is made, for example, of iron-based metal material such as steel material, or non-magnetic metal material such as aluminum, aluminum alloy or stainless steel. The substrate part 31 is press-fitted into the opening of the cylinder 12, and fluid-tightly seals the one end of the cylinder 12. How to attach the substrate part 31 to the cylinder 12 is not limited to press-fitting. Screwing, welding or other mode can be employed as the attaching mode.

The inner circumference of the substrate part 31 includes: a small-diameter portion 35 which is formed near the one end of the cylinder 12, and whose inner diameter is large enough for the small-diameter portion 35 to slidably touch the outer circumferential surface of the piston rod 13; a large-diameter portion 36 whose inner diameter is larger than that of the small-diameter portion 35; and an oil seal placement portion 37 which is formed between the small-diameter portion 35 and the large-diameter portion 36, and whose inner diameter is larger than that of the large-diameter portion 36.

The guide metal 32 is made, for example, of a metal material such as steel, aluminum alloy, copper alloy, stainless steel. The guide metal 32 is placed on the large-diameter portion 36.

The inner circumferential surface of the metal guide 32 of the embodiment is coated with fluororesin coating, or powder sintered compact of copper, tin, nickel or the like. Incidentally, the outer circumferential surface of the piston rod 13 of the embodiment is hard-plated or hard-coated with nickel, chromium, amorphous carbon (diamond-like carbon), ceramics, or the like. This configuration makes frictional resistant small between the contact surfaces (frictionally slidable portions) of the piston rod 13 and the guide metal 32.

The oil seal 26 of the embodiment is made of a polymer elastomer such as urethane resin, fluororesin and silicon resin, or a rubber-based material such as nitrile butyl rubber.

The oil seal 26 is provided on the oil seal placement portion 37 in the substrate part 31. The oil seal 26 is in press contact with the piston rod 13 and the substrate part 31, and thereby prevents the magnetorheological fluid composition from leaking to the outside.

It should be noted that: in the conventional vibration damping device using the conventional magnetorheological fluid composition, another oil seal is placed between the guide metal 32 and the first fluid chamber 14; and in contrast, the embodiment eliminates such an oil seal. The reason why this oil seal can be eliminated from the embodiment is that the embodiment uses the below-described magnetorheological fluid composition of the present invention, as described in detail later.

<Magnetorheological Fluid Composition>

The magnetorheological fluid composition contains: magnetic particles; a dispersant for dispersing the magnetic particles; and a friction modifier.

(Magnetic Particles)

Citable examples of the material of the magnetic particles include iron, iron nitride, iron carbide, carbonyl iron, chromium dioxide, low carbon steel, nickel and cobalt. Otherwise, usable as the material of the magnetic particles are, for example, iron alloys such as aluminum-containing iron alloy, silicon-containing iron alloy, cobalt-containing iron alloy, nickel-containing iron alloy, vanadium-containing iron alloy, molybdenum-containing iron alloy, chromium-containing iron alloy, tungsten-containing iron alloy, manganese-containing iron alloy and copper-containing iron alloy. Alternatively, usable as the material of the magnetic particles are, for example, paramagnetic, superparamagnetic or ferromagnetic chemical compound particles of gadolinium or an organic gadolinium derivative, or particles of their mixture.

It should be noted that magnetic particles of soft magnetic material are preferable since they are magnetized when a magnetic field is applied to them, and are substantially demagnetized when no magnetic field is applied to them.

As such a material of the magnetic particles, particularly carbonyl iron is preferable since carbonyl iron is a soft magnetic material with a low magnetic coercivity and a high magnetic permeability.

When obtained by the Brunauer-Emmett-Teller (BET) method, the average particle diameter of the magnetic particles may be set at approximately 50 nm to 50 µm. When used as the magnetorheological fluid, the magnetic particles has an average particle diameter of, preferably 1 µm to 10 µm, more preferably 2 µm to 9 µm, and most preferably 3 µm to 8 µm.

Furthermore, the surfaces of the magnetic particles may be modified for the purpose of enhancing the affinity of the particles for the dispersant and the dispersibility of the particles. The surface modification can be achieved, for example, by applying a silane coupling agent to the surfaces of the magnetic particles.

(Dispersant)

Any liquid capable of dispersing the magnetic particles may be used as the dispersant. Particularly, mineral oil and synthetic oil is preferable. Mineral or synthetic oil to be generally used as base oil for engine lubricating oil, driving oil, shock absorber fluid or machining oil may be used as the dispersant. Although no specific restriction is imposed on the viscosity coefficient of the dispersant, the viscosity coefficient at 40° C. is preferably in a range in 0.01 to 0.3 Pa·s, more preferably in a range in 0.02 to 0.2 Pa·s, and most preferably in a range in 0.03 to 0.15. Pa·s.

Furthermore, although no specific restriction is imposed on the pour point as an index of the low-temperature fluidity of the mineral oil and the synthetic oil, the pour point is preferably −20° C. or less, more preferably −30° C. or less, and most preferably −40° C. or less, because the mineral oil and the synthetic oil needs to be usable at low temperature.

Citable examples of the mineral oil include: distillates obtained by atmospherically distilling paraffinic crude oil, intermediate crude oil and naphthenic crude oil; distillates obtained by vacuum-distilling residual oil which remains after the atmospheric distillation; and refined oils, such as solvent-refined oil, hydrogenated refined oil, dewaxed oil and clay-treated oil, obtained by refining these distillates using conventional methods.

Citable examples of the synthetic oil includes poly α-olefin, α-olefin copolymer, polybutene, alkylbenzene, polyol ester, dibasic acid ester, olyoxyalkylene glycol, polyoxyalkylene glycol ester, polyoxyalkylene glycol ether, and silicone oil.

The above-cited dispersants can be used singly or in combination of two or more.

(Friction Modifier)

The friction modifier is an amine-based additive.

Citable examples of the amine-based additive include saturated aliphatic amine, unsaturated aliphatic amine, or aromatic amine. The amine-based additive may be primary amine, secondary amine, or tertiary amine. The primary amine is preferable. The more preferable is primary aromatic amine having a hydrocarbon chain having 14 to 22 carbon atoms. The hydrocarbon chain is preferably an alkyl chain or an alkenyl chain. The particularly preferable primary aromatic amine has an alkenyl chain. The alkenyl chain has, preferably 15 to 21 carbon atoms, and more preferably 16 to 20 carbon atoms. It should be noted that: oily effect can be expected from a hydrocarbon chain having 14 or more carbon atoms; and effect of adsorption on the friction surface can be expected from a hydrocarbon chain having 22 or less carbon atoms.

Herein, saturated aliphatic primary amine and unsaturated aliphatic primary amine are particularly preferable. Examples of the saturated aliphatic primary amine include decylamine, undecylamine, dodecylamine, tridecylamine, tetradecylamine, pentadecylamine, cetylamine, stearylamine, palmitylamine. Examples of the unsaturated aliphatic primary amine include oleylamine.

The content of the magnetic particles is 60 to 85 mass %.

In addition, the content of the dispersant inclusive of the friction modifier (additive) in the magnetorheological fluid composition is 15 to 40 mass %, more preferably 20 to 35 mass %, and most preferably 20 to 25 mass %. Viscous characteristic effect (during application of magnetic load) can be expected when the content of the magnetic particles is 60 mass % or greater. Dispersibility effect can be expected when the content of the magnetic particles is 85 mass % or less.

Furthermore, the content of the friction modifier (additive) in the magnetorheological fluid composition is 0.1 to 5 mass %, more preferably 0.4 to 3 mass %, and most preferably 0.7 to 1.5 mass %. Oily effect can be expected when the content of the friction modifier is 0.1 mass % or greater. Effect of adsorption on the friction surface can be expected when the content of the friction modifier is 5 mass % or less.

Moreover, an ester solvent such as sebacic acid bis (2-ethylhexyl), a viscosity modifier such as organophilic bentonite, a solid lubricant such as molybdenum disulfide, and other additives having functions such as dispersibility, heat resistance, oxidation resistance, corrosion resistance and defoaming property may be also added to the magnetorheological fluid composition.

The magnetorheological fluid composition is prepared by: blending the magnetic particles, the dispersant, and the friction modifier (additive) in their respective contents; and mixing them together.

The vibration damping device 10 of the embodiment having the above-discussed structure is manufactured by filling the cylinder 12 with the magnetorheological fluid composition before or after the piston 16 is installed in the cylinder 12.

Next, descriptions will be provided for working and effects which is obtained from the vibration damping device 10 of the embodiment.

The magnetorheological fluid composition used in the vibration damping device 10 is capable of further reducing frictional force between the frictionally slidable portions even in the case where the magnetorheological fluid composition inclusive of the magnetic particles exists between the frictionally slidable portions, since the magnetorheological fluid composition contains the above-discussed friction modifier. One may consider that the reason for the reduction in frictional force is that part of the magnetorheological fluid composition containing the friction modifier forms a low-friction boundary film between the frictionally slidable portions.

Furthermore, the vibration damping device 10 using this magnetorheological fluid composition is capable of reducing frictional force to a large extent while the vibration damping device 10 is in operation, and decreasing dependency of the frictional force on lateral force load.

Moreover, the vibration damping device 10 reduces the frictional force using the magnetorheological fluid composition containing the friction modifier, and the vibration damping device 10 is capable of reducing frictional force between each two component parts which slide over each other in the magnetorheological fluid composition. To put it specifically, the conventional vibration damping device (see Patent Literature 1, for example) reduces frictional force between the limited parts of the frictionally slidable portions defined by the porous member. In contrast to this, the vibration damping device 10 of the embodiment is capable of reducing frictional force in all the frictionally slidable portions which the magnetorheological fluid composition spreads, although its configuration is simpler than that of the conventional vibration damping device, and although it would otherwise need to rely on the internal structure.

Moreover, the vibration damping device 10 of the embodiment makes it possible to decrease the number of oil seals 26 (seal members) placed between the piston rod 13 and the rod guide 19, and is accordingly capable of reducing the frictional force much more.

Although the foregoing descriptions have been provided for the embodiment of the present invention, the present invention is not limited to the embodiment, and can be carried out in various modes.

Figure 4:
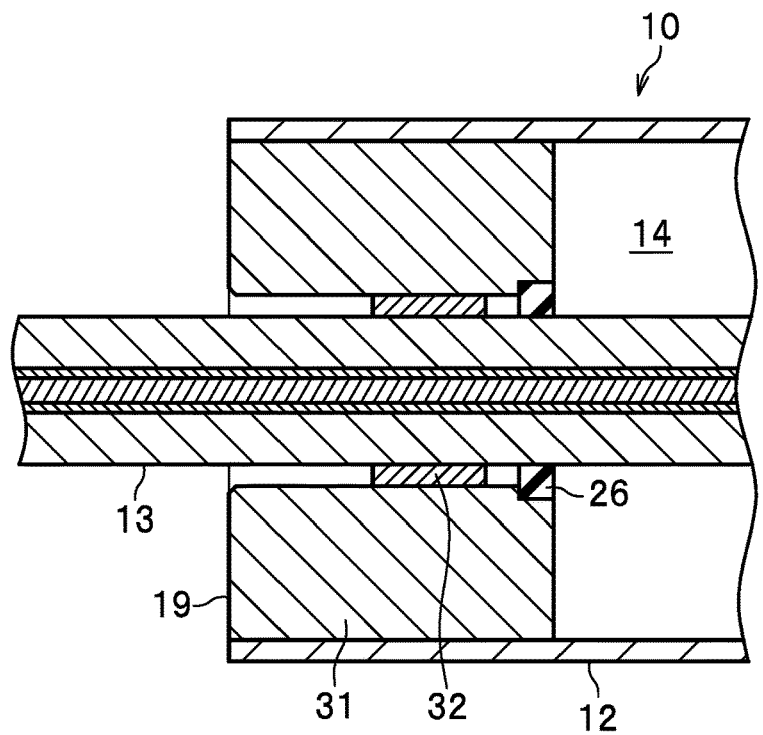
FIG. 4 is a partially magnified view illustrating an example of a conventional structure of the rod guide illustrated in FIG. 3.

FIG. 4 is a partially magnified view illustrating an example of a conventional structure of the rod guide 19 illustrated in FIG. 3.

In the embodiment, as illustrated in FIG. 3, the oil seal 26 between the substrate part 31 and the piston rod 13 in the rod guide 19 is placed closer to an opening end portion of the cylinder 12 (to the left in FIG. 3) than the guide metal 32 is. In other words, the guide metal 32 in the rod guide 19 of the embodiment is placed within the first fluid chamber 14, and is thus capable of sliding under a lubrication environment using the magnetorheological fluid composition of the embodiment.

In contrast to this, as illustrated in FIG. 4, in the rod guide 19 as the conventional structure example, the oil seal 26 between the substrate part 31 and the piston rod 13 is placed closer to the first fluid chamber 14 (to the right in FIG. 4) than the metal guide 32 is.

The conventional magnetorheological fluid composition has higher frictional force, and forms no boundary film between the frictionally slidable portions unlike the friction modifier of the embodiment. Thus, the magnetic particles contained therein are highly aggressive. Accordingly, in the rod guide 19 as the conventional structure example, it is necessary to avoid existence of the magnetic particles between the frictionally slidable portions of the guide metal 32 and the piston rod 13.

The guide metal 32 in the rod guide 19 as the conventional structure example undergoes dry friction with no magnetorheological fluid composition. The oil seal 26 and the piston 16 disposed at the distal end of the piston rod 13, however, can be lubricated in the environment using the magnetorheological fluid composition of the embodiment. This enables even the conventional structure as illustrated in FIG. 4 to reduce frictional force in the vibration damping device 10, and accordingly to use the magnetorheological fluid composition of the embodiment effectively, although the performance is not so high as that of the embodiment.

Figure 5:
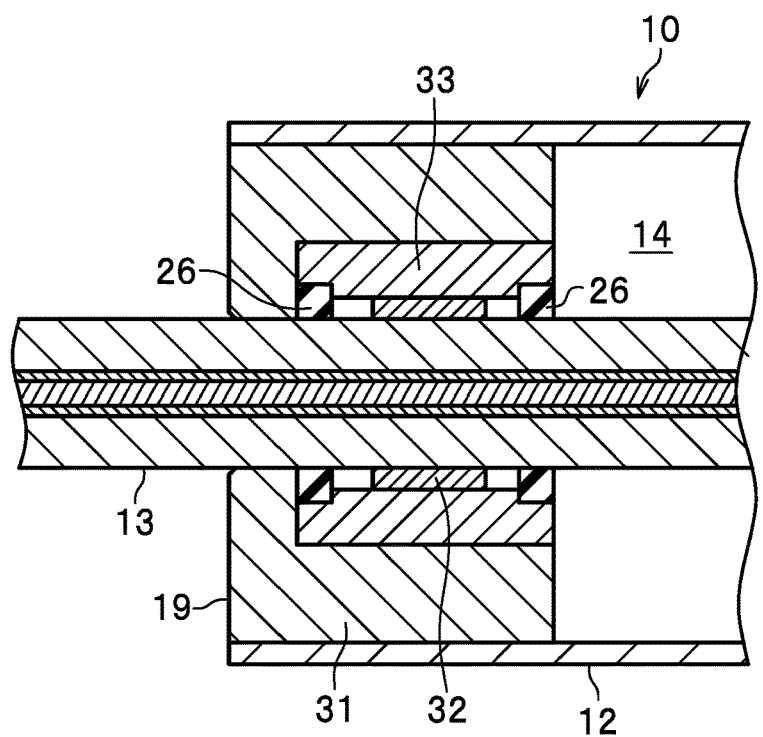
FIG. 5 is a partially magnified view illustrating an example of a conventional improved structure of the rod guide illustrated in FIG. 3.

FIG. 5 is a partially magnified view illustrating an example of a conventional improved structure of the rod guide 19 illustrated in FIG. 4.

As illustrated in FIG. 5, in the rod guide 19 as the conventional improved structure example, a guide metal holder 33 made of a substantially cylindrical body of a porous member is disposed surrounding the guide metal 32 through which the piston rod 13 is inserted. This guide metal holder 33 is fitted into the substrate part 31 of the substantially cylindrical rod guide 19. Reference sign 26 denotes oil seals. In the two axial end portions of the guide metal holder 33, respectively, the oil seals 26 seal the interstice between the guide metal holder 33 and the piston rod 13. Reference 12 denotes the cylinder. Reference 14 denotes the first fluid chamber.

In the vibration damping device 10 including the rod guide 19 as the conventional improved structure example, only the liquid components of the MRF composition, which are obtained by the filtering of the magnetic particles from the MRF composition by the guide metal holder 33 of the porous member, is supplied to the interstice between the piston rod 13 and the guide metal holder 33 in which the guide metal 32 is placed.

Thus, the vibration damping device 10 including the rod guide 19 with the conventional improved structure prevents the magnetic particles from existing between the frictionally slidable portions, and accordingly maintains the lubricity between the frictionally slidable portions using the liquid components of the MRF composition.

The multiple oil seals 26, however, need to be arranged in order to isolate the guide metal holder 33. This inevitably makes frictional force due to the oil seals 26 higher. In the vibration damping device 10 provided with the rod guide 19 of the conventional improved structure, however, the liquid components of the MRF composition is supplied to the interstice between the frictionally slidable portions of the guide metal 32 and the piston rod 13 via the guide metal holder 33 of the porous member. In the vibration damping device 10 provided with the rod guide 19 of the conventional improved structure, supplying the friction modification additive of the embodiment to the interstice between the frictionally slidable portions of the guide metal 32 and the piston rod 13 is capable of reducing friction although the performance is not as good as that of the embodiment.

Moreover, like in the conventional structure example illustrated in FIG. 4, the oil seals 26, and the piston 16 disposed at the distal end of the piston rod 13 are lubricated under the environment using the MRF composition of the embodiment. Accordingly, the piston 6 makes the frictional force reduced in the vibration damping device 10, and the magnetorheological fluid composition of the embodiment is effectively used in the vibration damping device 10.

The foregoing descriptions have been provided for how effective the magnetorheological fluid composition of the present invention is in embodiments other than the above-discussed embodiment. The present invention is not limited to the above-discussed embodiment, and may be carried out in other various embodiments.

In addition, although the foregoing embodiment has discussed the vibration damping device 10 to be used in vehicles, the vibration damping device 10 is limited to this use. The vibration damping device 10 is also applicable to anti-vibration devices in other fields such as the home appliance field and the civil engineering/construction equipment field.

Example

Descriptions will be hereinbelow provided for Example to be used to examine the working and effects of the present invention, and Comparative Examples 1 to 4. It should be noted that: the present invention is not limited to the following example; and the present invention can be carried out by being arbitrarily modified within a scope not departing from the gist and spirit of the present invention.

<Preparation of Magnetorheological Fluid Compositions>

First of all, standard MRF (MRF 126-CD, produced by Lord Corporation), generally commercially available as MRF, was used as the base material of magnetorheological fluid compositions. Incidentally, the standard MRF contains magnetic particles and a dispersant for dispersing the magnetic particles.

Next, the magnetorheological fluid compositions to be used for Example and Comparative Examples 1 to 4 were prepared by mixing the base material and the friction modifier in accordance with the contents (mass %) shown in Table 1.

TABLE 1

|  | Comparative Example 1 | Comparative Example 2 | Comparative Example 3 | Comparative Example 4 | Example |
|---|---|---|---|---|---|
| MRF (standard · base) (mass %) | 100 | 99 | 99 | 99 | 99 |
| Phosphorus-based Additive (mass %) |  | 1 |  |  |  |
| Fatty Acid (mass %) |  |  | 1 |  |  |
| Amino Acid-based Additive (mass %) |  |  |  | 1 |  |
| Amine-based Additive (mass %) |  |  |  |  | 1 |

The amine-based additive as the friction modifier in Example was monooleylamine (9-octadecene-1-amine) having a hydrocarbon chain having 18 carbon atoms.

The magnetorheological fluid composition in Comparative Example 1 was the base material itself.

The phosphorus-based additive in Comparative Example 2 was oleyl acid phosphate.

The fatty acid in Comparative Example 3 was stearic acid.

The amino acid-based additive in Comparative Example 4 was N-oleyl sarcosine.

<Measurement of Friction Coefficients>

Each coefficient of friction between the frictionally slidable part of the oil seal 26 (see FIG. 3) and the frictionally slidable part of the piston rod 13 (see FIG. 3) was measured on the assumption that the oil seal 26 was made of urethane resin and the surface of the piston rod 13 was plated with hard chromium.

The measurement test was conducted by: applying the prepared magnetorheological fluid composition onto a metal plate whose surface was plated with hard chromium; and reciprocally sliding a urethane resin-made block body over the metal plate while applying a load of 19.6 N (2.00 kgf) to the block body. The measurement test temperature was 60° C.; the sliding stroke was 10 mm; and the sliding speed was 0.5 mm/s.

Figure 6:
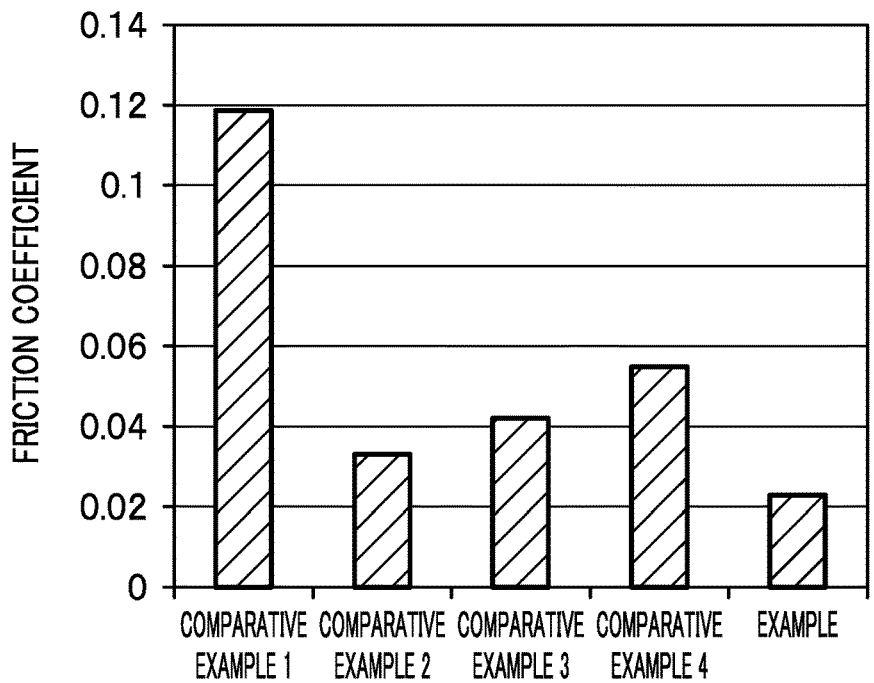
FIG. 6 is a graph comparatively showing a result of measurement test of a friction coefficient of an example of the present invention and those of comparative examples.

Table 2 and FIG. 6 show results of measuring the friction coefficients.

TABLE 2

|  | Comparative Example 1 | Comparative Example 2 | Comparative Example 3 | Comparative Example 4 | Example |
|---|---|---|---|---|---|
| Friction Coefficient | 0.119 | 0.033 | 0.042 | 0.055 | 0.023 |

FIG. 6 is a graph comparatively showing a result of measurement test of the friction coefficient of Example of the present invention and results of measurement test of the friction coefficients of Comparative Examples 1 to 4.

<Measurement of Frictional Forces>

Each frictional force between the frictionally slidable part of the cylindrical guide metal 32 (see FIG. 3) and the frictionally slidable part of the piston rod 13 was measured on the assumption that the inner circumferential surface of the guide metal 32 is coated with polytetrafluoroethylene (PTFE) and the surface of the piston rod 13 was plated with hard chromium.

Figure 7:
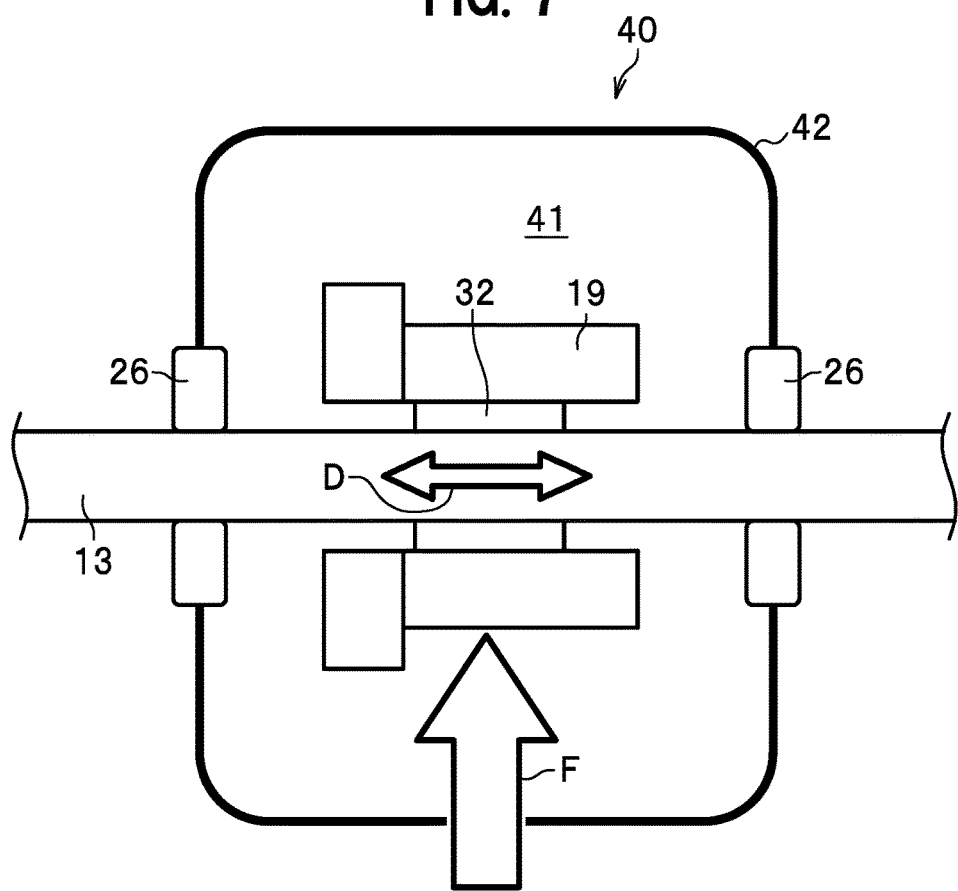
FIG. 7 is a schematic diagram of a test apparatus which measured frictional forces in the example of the present invention and the comparative examples.

FIG. 7 is a schematic diagram of a test apparatus which measured frictional forces.

The test apparatus 40 included: an oil bath 42 filled with a magnetorheological fluid composition 41; and the rod guide 19 which was placed inside the oil bath 42, and to which the guide metal 32 was attached.

In FIG. 7, reference sign 13 denotes the piston rod which was inserted through the guide rod 19, and which was slidably supported by the guide metal 32. Reference sign 26 denotes the oil seals which fluid-tightly sealed the interstice between the oil bath 42 and the piston rod 13.

This test apparatus 40 was designed to apply load F to the interstice between the guide metal 32 and the piston rod 13 via the rod guide 19 while reciprocating the piston rod 13 in the axial directions D.

First of all, in this measurement test, frictional forces were measured which were produced by sliding the piston rod 13 for four hours under conditions including a sliding speed of 25 mm/s, a sliding stroke of 10 mm and a load (F) of 150 N. Incidentally, the measurement test was conducted with the frictionally slidable parts completely soaked in the magnetorheological fluid composition. Table 3 and FIG. 8 show results of this first measurement.

TABLE 3

|  | Comparative Example 1 | Comparative Example 2 | Comparative Example 3 | Comparative Example 4 | Example |
|---|---|---|---|---|---|
| Frictional Force [N] | 51.5 | 40.3 | 45.1 | 46.6 | 23.7 |

FIG. 8 is a graph comparatively showing a result of the first measurement of the frictional force of Example and those of Comparative Examples 1 to 4.

After this measurement test, frictional forces were measured which were produced by sliding the piston rod 13 under conditions including a sliding speed of 0.15 mm/s, a sliding stroke of 5 mm, as well as loads (F) of 50 N, 150 N and 300 N. Table 4 and FIG. 9 show results of this second measurement.

TABLE 4

| Frictional Force [N] | | Comparative Example 1 | Comparative Example 2 | Comparative Example 3 | Comparative Example 4 | Example |
|---|---|---|---|---|---|---|
| Load [N] | 50 | 28.8 | 24.8 | 25.1 | 27.2 | 15.1 |
|  | 150 | 51.5 | 40.3 | 45.1 | 46.6 | 23.7 |
|  | 300 | 96.3 | 62.6 | 76.4 | 77.3 | 38.5 |

FIG. 9 is a graph showing results of the second measurement of frictional forces obtained by sliding the piston rod with loads (F) of 50 N, 150 N and 300 N in Example and those in Comparative Examples 1 to 4.

<Results of Evaluation of Magnetorheological Fluid Compositions>

As shown in FIG. 6, the friction coefficients obtained by the friction between the oil seal 26 (see FIG. 3) made of urethane resin and the piston rod 13 (see FIG. 13) plated with hard chromium using the magnetorheological fluid compositions of Example and Comparative Examples 2 to 4 were less than half of that obtained using the magnetorheological fluid composition of Comparative Example 1 (the base material). Particularly, the friction coefficient obtained using the magnetorheological fluid composition of Example was approximate one sixth of that obtained using the magnetorheological fluid composition of Comparative Example 1 (the base material).

As shown in FIG. 8, the frictional force of the piston rod 13 plated with hard chromium against the guide metal 32 (see FIG. 3) coated with polytetrafluoroethylene (PTFE) in use of the magnetorheological fluid composition of Example was approximately a half of those in use of the magnetorheological fluid compositions of Comparative Examples 1 to 4.

As shown in FIG. 9, the frictional forces of the piston rod 13 plated with hard chromium, which were obtained by sliding the piston rod 13 over the guide metal 32 (see FIG. 3) coated with polytetrafluoroethylene (PTFE) with loads (F) of 50 N, 150 N and 300 N in use of the magnetorheological fluid composition of Example, were extremely smaller than those obtained in use of the magnetorheological fluid compositions of Comparative Examples 1 to 4. The rate (gradient) of increase in frictional force with respect to each load (N) in use of the magnetorheological fluid composition of Example was the smallest among all the measured rates.

REFERENCE SIGNS LIST

10 vibration damping device
12 cylinder
12a eyepiece
13 piston rod
14 first fluid chamber
15 second fluid chamber
16 piston
17 high-pressure gas chamber
18 free piston
19 rod guide
21 communication hole
22 electromagnetic coil 23 power supply line
26 oil seal
31 substrate part
32 guide metal
33 guide metal holder
35 small-diameter portion
36 large-diameter portion
37 oil seal placement portion

The invention claimed is:

1. A magnetorheological fluid composition comprising:
   magnetic particles;
   a dispersant having the magnetic particles dispersed in the dispersant; and
   a friction modifier,
   wherein the friction modifier is an amine-based additive having a hydrocarbon chain having 14 to 22 carbon atoms,
   wherein the content of the friction modifier is 0.1 to 5 mass % relative to a total amount of the magnetorheological fluid composition.

2. A vibration damping device comprising:
   a cylinder filled with the magnetorheological fluid composition according to claim 1;
   a piston rod inserted through the cylinder;
   a piston connected to the piston rod and disposed in the cylinder to be slidable in an axial direction;
   a first fluid chamber and a second fluid chamber defined in the cylinder by the piston and each containing the magnetorheological fluid composition;
   a communication hole formed in the piston in such a way that the first fluid chamber and the second fluid chamber communicate with each other through the communication hole; and
   an electromagnetic coil configured to apply a magnetic field to the magnetorheological fluid composition flowing in the communication hole.

* * * * *